United States Patent
Kostin

(10) Patent No.: US 7,980,525 B2
(45) Date of Patent: Jul. 19, 2011

(54) LOCKING DEVICE FOR A RAIL ADJUSTMENT SYSTEM

(75) Inventor: Sergej Kostin, Coburg (DE)

(73) Assignee: Brose Fahrzeugteile GmbH & Co., Coburg (DE)

( * ) Notice: Subject to any disclaimer, the term of this patent is extended or adjusted under 35 U.S.C. 154(b) by 234 days.

(21) Appl. No.: 12/128,094

(22) Filed: May 28, 2008

(65) Prior Publication Data

US 2008/0308704 A1    Dec. 18, 2008

(30) Foreign Application Priority Data

Jun. 14, 2007 (DE) .......................... 10 2007 027 321

(51) Int. Cl.
*F16M 13/00* (2006.01)
(52) U.S. Cl. ................. 248/429; 297/344.11; 297/463.1
(58) Field of Classification Search ................. 248/429, 248/424; 297/216.18, 344.11, 463.1
See application file for complete search history.

(56) References Cited

U.S. PATENT DOCUMENTS

| | | | |
|---|---|---|---|
| 6,126,133 A | | 10/2000 | Timon et al. |
| 6,637,712 B1 * | | 10/2003 | Lagerweij ..................... 248/429 |
| 6,669,284 B2 * | | 12/2003 | Feichtinger et al. ..... 297/216.18 |
| 6,764,054 B2 * | | 7/2004 | Becker et al. ................. 248/429 |
| 7,165,753 B2 * | | 1/2007 | Oh ............................... 248/429 |
| 7,191,995 B2 * | | 3/2007 | Kim .............................. 248/429 |
| 7,207,541 B2 * | | 4/2007 | Frohnhaus et al. ............ 248/429 |
| 7,600,816 B2 * | | 10/2009 | Bauersachs et al. ........... 297/341 |
| 7,661,646 B2 * | | 2/2010 | Weber ........................... 248/429 |
| 7,669,825 B2 * | | 3/2010 | Sung ............................. 248/429 |
| 2003/0006355 A1 * | | 1/2003 | Horsfield et al. .............. 248/429 |
| 2003/0209930 A1 * | | 11/2003 | Horsfield et al. ........... 297/344.1 |
| 2004/0164600 A1 * | | 8/2004 | Rausch et al. .............. 297/344.1 |
| 2004/0169409 A1 * | | 9/2004 | Rausch et al. ................. 297/341 |
| 2008/0315662 A1 * | | 12/2008 | Suck et al. .................. 297/463.1 |
| 2009/0021064 A1 * | | 1/2009 | Shao ........................... 297/344.1 |

FOREIGN PATENT DOCUMENTS

| | | |
|---|---|---|
| DE | 29700866 | 3/1997 |
| DE | 199 18 622 | 11/1999 |
| DE | 19825099 | 12/1999 |
| DE | 100 41 605 | 1/2002 |
| DE | 10228314 | 2/2003 |
| DE | 20313951 | 1/2005 |
| DE | 20318787 | 4/2005 |
| GB | 2 253 999 | 9/1992 |
| WO | WO 99/62737 | 12/1999 |

OTHER PUBLICATIONS

English language Abstract for German Patent No. DE 100 41 605.

* cited by examiner

*Primary Examiner* — Terrell Mckinnon
*Assistant Examiner* — Bradley H Duckworth
(74) *Attorney, Agent, or Firm* — Scott T. Weingaertner; Joseph D. Eng, Jr.; King & Spalding LLP

(57) ABSTRACT

A locking device for a rail adjustment system of a vehicle seat, with a number of locking bolts and with a lever element, which is pivotable about a pivoting axis, for unlocking the locking bolt is provided, wherein the locking bolts can be unlocked by an application of force to an adjusting surface of the lever element in the unlocking direction. Furthermore, a rail adjustment system is provided which comprises an upper rail which can be connected to a vehicle seat, a lower rail which can be mounted in a positionally fixed manner, an articulation shaft and a locking device of the type mentioned at the beginning.

12 Claims, 6 Drawing Sheets

Fig. 4

LOCKING DEVICE FOR A RAIL ADJUSTMENT SYSTEM

FIELD OF THE INVENTION

The invention relates to a locking device for a rail adjustment system, furthermore to a rail adjustment system with a device of this type, and furthermore to a vehicle seat of a motor vehicle with a rail adjustment system of this type.

BACKGROUND OF THE INVENTION

A rail adjustment system for a vehicle seat usually comprises a lower rail which is mounted such that it is fixed on the vehicle, and an upper rail which is connected to the vehicle seat and is mounted in a linearly adjustable manner in relation to the lower rail. The vehicle seat can be positioned in the longitudinal direction of the vehicle therewith. The rail adjustment system is assigned a locking device by means of which the upper rail is locked to the lower rail in a desired longitudinal position of the vehicle seat.

The locking device has to secure the vehicle seat in an adjusted longitudinal position, in particular under extreme applications of force that occur in a crash situation. At the same time, it is desirable for the locking device to be actuatable ergonomically and, in particular, simply and without a relatively great effort.

A locking device known from DE 203 13 951 U1 comprises a plurality of locking bolts which are arranged one behind another and can be lowered vertically, and a lever element which is mounted pivotably about a horizontal pivot axis parallel to the direction in which the locking bolts are arranged. For unlocking purposes, the lever element engages on the end side by means of fork-shaped extensions behind the locking bolts in the unlocking direction. The locking device is mounted on the upper rail of a rail adjustment system of the type mentioned at the beginning, with the lower rail having a perforated grid with spaced-apart latching openings for receiving the locking bolts. The locking bolts are provided with spring elements on their circumference. Said spring elements press the locking bolts in the locking direction, are compressed by the lever element during an unlocking operation and, as a result, form a resetting force.

The distance between the latching openings on the perforated grid of the lower rail differs from the distance between the locking bolts of the locking device, and therefore, in the locked state of the rail adjustment system, not all of the locking bolts are fully lowered, but rather at least one of the locking bolts is situated in a prestressed state between two latching openings on the lower rail. At high acceleration—for example caused by a crash situation—the vehicle seat is moved due to the inertia, and therefore the lowered locking bolts absorb part of the force of inertia of the vehicle seat and convert it into deformation forces. The upper rail is displaced in the process in relation to the lower rail. The prestressed locking bolt briefly slides over the next free latching opening in the direction of movement and is lowered by the spring force of the spring element, and therefore the locking bolt is activated as an additional means of securing from the rear.

The lever element of the known locking device has a surface which, with respect to the pivot axis, is arranged lying opposite the fork-shaped extensions and which is designed for the introduction of force by means of further means. To unlock the locking bolts, the surface is pressed in the locking direction. The size and shaping of the surface are determined so as to reduce, in accordance with lever principles, the force to be applied to the force introduction point of the surface for the unlocking of the locking bolts. The longer the lever arm on the side of the surface facing the pivot axis, the proportionally smaller the unlocking force to be applied turns out to be.

The surface of the lever element and the further means which are designed for introducing force to the surface are, overall, space-intensive. If the locking device is arranged on the lower side of the seat, the surfaces engage in the region between the seat rails, as a result of which the construction space and the freedom of design for the configuration of the geometry on the lower side of the seat may be limited.

SUMMARY OF THE INVENTION

The invention is based on the object of providing a locking device for a rail adjustment system of a vehicle seat, which locking device is designed as a subassembly which is as compact as possible and which is connected to the rail adjustment system in as space-saving a manner as possible. Furthermore, a rail adjustment system is to be provided which is designed to be as space-saving as possible. Furthermore, a vehicle seat is to be provided which, with regard to the configuration of the seat geometry, is as improved and cost-effective as possible.

The first object is achieved according to the invention by a locking device for a rail adjustment system of a vehicle seat, with at least one locking bolt and with a lever element, which is pivotable about a pivot axis, for unlocking the locking bolt. The locking device is characterized in that each locking bolt can be unlocked by an application of force to an adjusting surface of the lever element in the unlocking direction.

The invention is based on the consideration of being able to reduce the space required by the locking device essentially by entirely omitting the formation of a space-consuming surface of the lever element for the actuating introduction of force such that it is opposite the locking bolts, with respect to the pivot axis. This can be achieved in that the pivot axis is located in the lateral edge region of the lever element. The surface elements of the lever element, which elements serve to introduce and transmit force, are then formed on one and the same side with respect to the pivot axis. In particular, the adjusting surface which is set up for the actuating introduction of force to the lever element is therefore arranged, with respect to the pivot axis, on the same side as the locking bolt.

Accordingly, an unlocking movement and a locking movement always imply a uniformly directed introduction of force to the adjusting surface in the unlocking and in the locking directions.

An application of force in the unlocking direction on the adjusting surface therefore brings about an unlocking pivoting movement of the lever element with the smallest possible construction volume for the locking device. This arrangement principle therefore permits the design of the locking device as a compact subassembly, the space requirement of which is essentially limited to a relatively close environment around the rails of the rail adjustment system assigned the locking device.

An unlocking pin is preferably formed, which unlocking pin acts on the adjusting surface of the lever element and can be actuated in the unlocking direction of the locking bolt by an eccentric surface. In this case, the unlocking pin executes a linear movement and serves as a mechanical connecting element between the eccentric surface and the adjusting surface, with the unlocking movement being introduced by movement of the eccentric surface.

In particular, in an arrangement of this type, the unlocking pin is arranged parallel to the locking bolt, preferably essentially in the same position as the locking bolt with respect to the direction orthogonal to the unlocking direction and to the pivot axis. The extent of the locking device along this direction therefore remains restricted essentially to the region between the locking bolt and the intersecting point with the pivot axis, as a result of which the locking device can assume a particularly compact, space-saving form.

The unlocking pin expediently rests on the end side on the eccentric surface and on the opposite end side on the adjusting surface. The unlocking pin therefore acts as a direct mechanical connecting element of the eccentric surface to the adjusting surface. The unlocking pin produces the single connecting element between the eccentric surface and the adjusting surface, and therefore in practice further mechanical coupling components can be dispensed with.

Furthermore, the adjusting surface is advantageously enclosed by a template for the end-side guidance of the unlocking pin. The template may be predetermined, for example, by means of a surface structure which can be placed onto the adjusting surface by means of a clip connection. Said surface structure has a fold with which the adjusting surface is gripped from behind on the rear side. In addition, it has a central cutout, with the cutout surface containing the entirety of contact points with the adjusting surface over the course of the pivoting movement of the unlocking pin and therefore the edge surface of the cutout forms a contour which guides and secures the unlocking pin.

The eccentric surface is appropriately formed on a rotational element, and the unlocking pin can be actuated by the eccentric surface by means of a rotational movement of the rotational element. The rotational movement of the rotational element is therefore converted into the linear movement of the unlocking pin by means of the eccentric surface. The distance of the eccentric surface from the axis of rotation of the rotational element therefore depends on the angle of rotation of the rotational element. The eccentric surface is preferably shaped such that it corresponds in the direction of the axis of rotation to the end side of the unlocking pin and is curved in the direction of rotation with a monotonously variable radius with respect to the axis of rotation. As a result, during a rotational movement of the rotational element, the unlocking pin is moved uniformly in the unlocking direction or locking direction. For this purpose, in a special configuration, the eccentric surface is bent in a worm-shaped manner such that, during a rotation of the rotational element through approximately 180°, the supporting surface of the unlocking pin is guided by the inside of the worm surface over the bent portion on the outside, or vice versa, with the unlocking pin being guided in the unlocking direction and being lowered in the locking direction. The rotational element is expediently designed as a single-piece plastic part. Different and, in particular, also complex surface geometries for the eccentric surface can therefore be produced in a simple manner, which is particularly cost-effective for production in large piece numbers.

Since the rotational element lies in the direction in which the unlocking pin extends, in particular the rotational element is arranged with respect to the axis of rotation such that it is essentially in the same position as the locking bolts.

The rotational element is preferably connected on the end side to an articulation shaft which is arranged horizontally and orthogonally with respect to the pivot axis. The axis of rotation of the articulation shaft therefore defines the axis of rotation of the rotational element. The rotational element is rotated via the articulation shaft and, as a result, the unlocking pin is actuated for the unlocking or locking of the locking device.

The rotational element is, in particular, of essentially hollow-cylindrical design on a subsection of the axis of rotation, and it can therefore be placed on the end side onto the articulation shaft in a form-fitting manner. The rotational element is preferably provided with latching elements for forming a clip connection to the articulation shaft.

In order for the articulation shaft to be held in a stable manner on the end side, the rotational element is preferably mounted on the end side facing away from the articulation shaft in a rotatable manner with respect to the axis of rotation on a retaining bracket connected to the rail adjustment system. The retaining bracket is designed in order to produce the connection of the articulation shaft to the rail adjustment system via the rotational element if, because of function or construction, the rotational element cannot be mounted rotatably directly on the rail adjustment system.

In a preferred variant embodiment of the locking device, a supporting plate is provided to which the lever element is pivotably coupled and which has bores for each locking bolt and for the unlocking pin. The connection of the lever element to the upper rail of a rail adjustment system is produced via said supporting plate by the supporting plate expediently resting on the upper side on the upper rail. The upper rail has bores corresponding to the bores of the supporting plate, and therefore, in the fitted state of the locking device, the mutually corresponding bores are aligned with one another. The locking bolt and the unlocking pin therefore pass consecutively through the upper rail and the supporting plate in the unlocking direction and in a correspondingly opposed manner in the unlocking direction.

In order to couple the lever element to the supporting plate, a pivot pin which is coaxial with respect to the pivot axis is advantageously formed and to which the lever element is connected and which is mounted on both end sides in a respective bore in a side surface of the supporting plate. In this case, the side surfaces lie essentially in a plane orthogonal to the pivot axis.

For improved support on the upper rail, the supporting plate is expediently designed in the form of an angled element. Furthermore, the supporting plate is advantageously provided with a supplementary retaining means for fixing it to the upper rail.

The advantages obtained by the invention consist, in particular, in a locking device, in which the locking bolts can be unlocked by an application of force to an adjusting surface of a lever element in the unlocking direction, being of particularly space-saving construction. The locking device is therefore particularly suitable for a rail adjustment system of a vehicle seat, in which the articulation shaft is enclosed by a ring element for connection to an actuating element, in particular by means of a cable pull connected peripherally to the ring element. The ring element therefore takes on the function of a cable pulley for a rotational movement of 180°. By means of the shaping of the ring element, the force to be applied for unlocking purposes can be predetermined in a flexible manner, since said force is inversely proportional to the distance of the engagement point from the longitudinal axis of the articulation shaft.

BRIEF DESCRIPTION OF DRAWINGS

FIG. 4 shows the locking device in a locked state in longitudinal section.

DETAILED DESCRIPTION

Mutually corresponding parts are provided with the same reference numbers in all of the figures.

Figure 1:
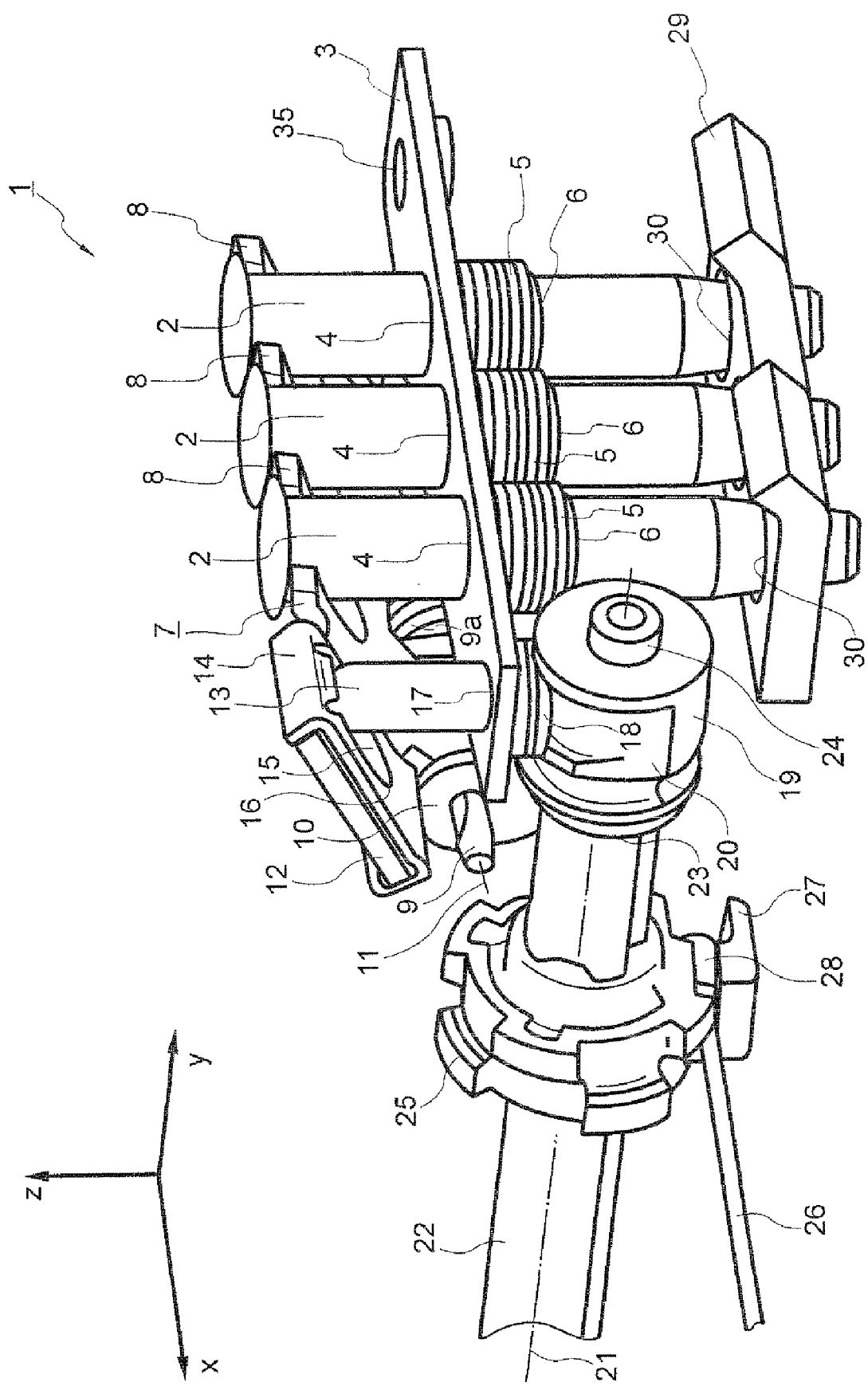
FIG. 1 shows, in a perspective illustration, a locking device which is connected to an articulation shaft, in an unlocked state.
Figure 2:
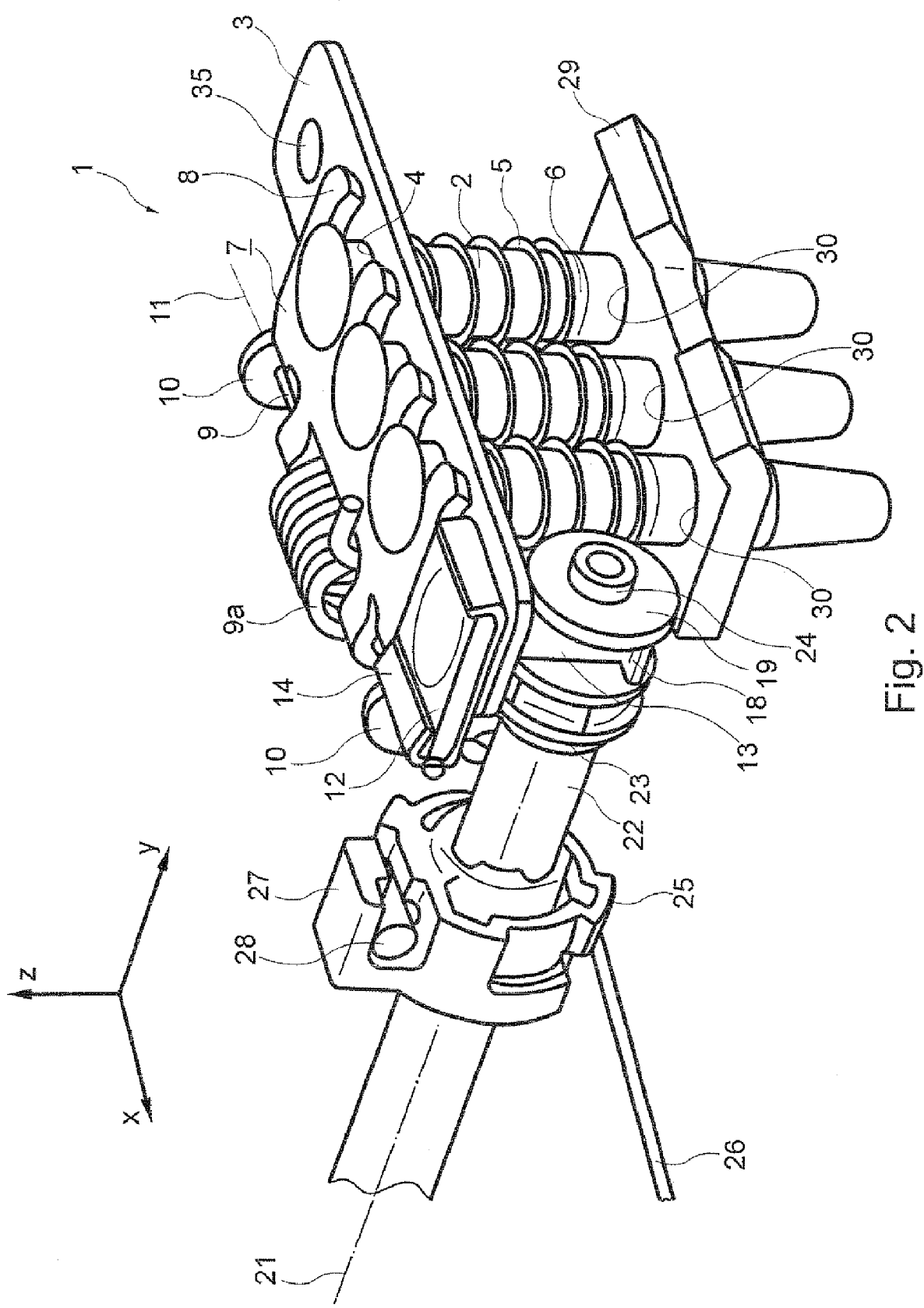
FIG. 2 shows the locking device connected to the articulation shaft, according to FIG. 1, in a locked state.

FIGS. 1 and 2 illustrate the locking device 1 in a laterally perspective view in an unlocked or in a locked state. The locking device 1 comprises three locking bolts 2 which are arranged one behind another and can be lowered in a vertical direction (inverse z direction) from an unlocked position (FIG. 1) into a locked position (FIG. 2). The locking bolts 2 pass through a supporting plate 3 and the upper rail of a rail adjustment system, on which the supporting plate 3 rests (compare FIGS. 5, 6), in bores 4 designed for this purpose. By means of prestressable spring elements, which engage around the locking bolts 2 and bear on the upper end side against the supporting plate 3 (compare FIGS. 3 and 4) and are clamped on the lower end side in a groove 6 of a respective locking bolt 2, a resetting force in the locking direction (inverse z direction) is built up on the locking bolts 2.

Furthermore, a lever element 7 which is coupled pivotably to the supporting plate 3 is designed to raise the locking bolts 2 out of the locked position (FIG. 2) into the unlocked position (FIG. 1), i.e., in the unlocking direction (z direction), counter to the resetting force of the spring elements 5 by means of fork-shaped extensions 8 which engage behind the locking bolts 2 on the upper end side. The lever element 7 is coupled to the supporting plate 3 via a pivot pin 9 formed along the x direction. In this case, the pivot pin 9 is mounted on the end side in surface elements 10 of the supporting plate 3, which surface elements are formed parallel to the yz plane. The pivot axis 11 of the lever element 7 is therefore parallel to the x direction.

In a co-planar manner to the fork-shaped extensions 8, the lever element 7 is assigned an adjusting surface 12 which can be actuated in the unlocking direction (z direction) by a vertical unlocking pin 13. In this case, the unlocking pin 13 exerts a force on the adjusting surface 12, which force is greater than all of the forces driving the lever element 7 in the locking direction (inverse z direction), and in particular is greater than the sum of the restoring forces induced by the spring elements 5 as a function of the vertical position.

The action of the spring means 5 as locking actuators is supplemented by the spring force of a helical spiral spring 9a running concentrically around the pivot pin 9. Whereas the spring means 5 are designed so as each to form a sufficiently large force to drive the corresponding locking bolt 2 in the locking direction (inverse z direction), the helical spiral spring 9a acts on the lever element 7 by the helical spiral spring 9a inducing an angle-dependent resetting force between the lever element 7 and the supporting plate 3 by clamping against the lever element 7 and the supporting plate 3. By means of said decoupling of the spring actions in the locking device 1, the respective spring means 5 and 9a for the locking bolts 2 and for the lever element 7 can be selected independently of each other.

The position of the unlocking pin 13 with respect to the y direction is essentially identical to the positions of the locking bolts 2 with respect to the y direction. The introduction of force in the unlocking direction (z direction) to the lever element 7 therefore in particular takes place with respect to the y direction on the same side as the pivot axis 11 instead of as per the introduction of forces acting on the lever element 7 in the locking direction (inverse z direction). This permits a less space-intensive design of the lever element 7 in comparison to a design in which the force introduction points for the locking and unlocking are positioned, with respect to the y direction, such that they lie opposite the pivot axis 11.

The unlocking pin 13 bears on the upper end side directly against the adjusting surface 12, with the adjusting surface 12 being enclosed by a template 14, which engages behind it, with a central recess 15. The edge surface 16 of the central recess 15 guides and secures the unlocking pin 13 over the course of the pivoting movement of the lever element 7 about the pivot axis 11. The unlocking pin 13 passes through the supporting plate 3 and the upper rail of the rail adjustment system in a bore 17 set up for this purpose. A widened supporting surface 18 is formed on the lower end side of the locking pin 13, via which supporting surface the unlocking pin 13 stands on an eccentric surface 20 formed in a rotational element 19.

Like the supporting plate 3, the rotational element 19 forms a mechanical interface of the locking device 1 with the rail adjustment system. The rotational element 19 is mounted in a manner such that it can pivot through essentially 180° about an axis of rotation 21, with the axis of rotation 21 lying parallel to the y direction. By means of the shaping of the eccentric surface 20, during a pivoting movement of the rotational element 19, the unlocking pin 13 which rests on it is guided in the locking direction (inverse z direction) or is pressed in the unlocking direction (z direction) in a manner applying the unlocking action (compre FIGS. 3, 4).

The rotational element 19 is connected on the end side to an articulation shaft 22, the longitudinal axis of which lies coaxially with respect to the axis of rotation 21. For this purpose, the rotational element 19 forms a plug-in ring 23 with which the rotational element 19 engages in a form-fitting manner around the articulation shaft 22. On the opposite end side, the rotational element 19 forms a hollow-cylindrical extension 24 via which the rotational element 19 is mounted rotatably on a retaining means, which is connected fixedly to the rail adjustment system, and supports the articulation shaft 22 on the end side.

The articulation shaft 22 is engaged around in a form-fitting manner by a ring element 25 which is designed for the guidance of a cable pull 26. The distance of the cable pull 26, which can be wound up on the end side onto the ring element 25, from the axis of rotation 21 defines the force to be applied for unlocking. The greater the distance, the smaller is the force which is to be applied. A clamping tab 27 is integrally formed on the outer side of the ring element 25 and secures a thickened end side 28 of the cable pull 26 by clamping. The other end side of the cable pull 26 is connected to an actuating element.

By means of a pulling action on the cable pull 26, which action is exerted via the actuating element, from the configuration illustrated in FIG. 2, the ring element 25, the articulation shaft 22 and therefore the rotational element 19 are rotated through 180°. As a result, the unlocking pin 19 is raised on the eccentric surface 20 and, via the adjusting surface 12, presses the lever element 7 in the unlocking direction (z direction) counter to the resetting forces of the spring elements 5 and of the helical spiral spring 9a, which resetting forces act in the locking direction (inverse z direction) and raises the locking bolts 2 with the lever element 7 until the configuration illustrated in FIG. 1 is reached. If the pulling action is stopped, the resetting forces of the spring elements 5 and of the helical spiral spring 9a exert a reversible movement until the configuration illustrated in FIG. 2 is reached.

Also visible in the illustrations of FIGS. 1 and 2 is a deformable block 29 made of a plastically deformable material, which is connected on the edge side to the upper rail of the rail adjustment system and through which the locking bolts 2 pass in bores 30 until they engage in latching holes or openings (not visible) formed for this purpose in the lower rail of the rail adjustment system. This supporting block 29 is assigned the locking device 1 and, in the event of a crash, absorbs some of the forces of inertia which are triggered.

Figure 4:
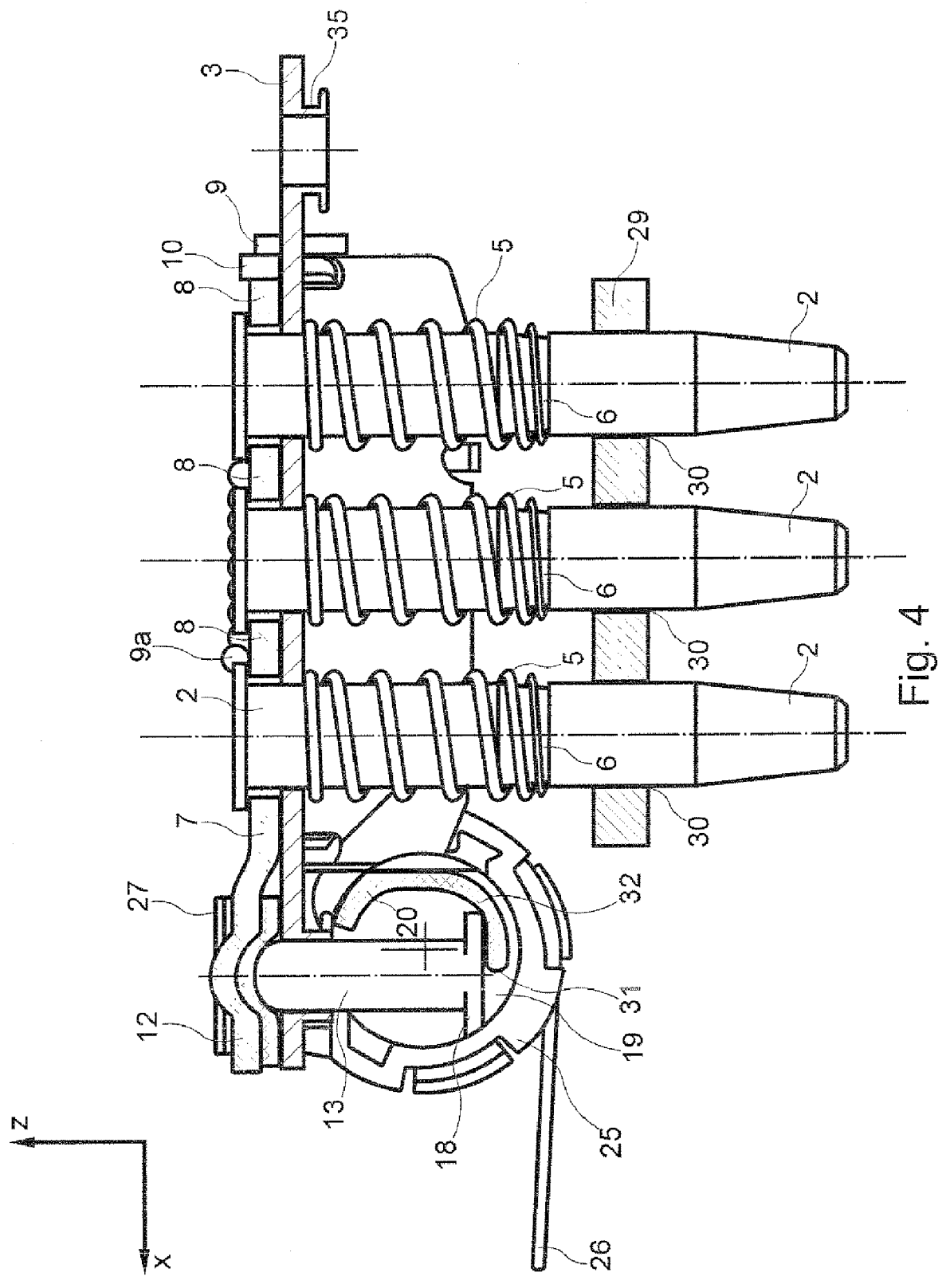

In an analogous manner to the illustrations in FIGS. 1 and 2, FIGS. 3 and 4 illustrate the locking device 1 in an unlocked and in a locked state, respectively, in longitudinal section along the x direction such that the plane of the figure lies plane-parallel to the xz plane. The y direction points perpendicularly out of the plane of the figure. The spring elements 5 which each surround the locking bolts 2 and bear on the upper end side against the supporting plate 3 are comparatively clearly visible. The diameter of the bores 4 is therefore precisely of sufficient size in order to allow the respective locking bolt 2 to pass through, and therefore a sufficiently wide supporting surface for the spring elements 5 is also formed. The diameter of the bores corresponding to the bores 4 in the upper rail of the rail adjustment system, on which the supporting plate 3 rests and which is not visible in the illustrations of FIG. 1 to FIG. 4 is therefore at least the same size as the diameter of the spring elements 5 in the xy plane. On the lower end side, the spring elements 5 are clamped to the groove 6 formed in the respective locking bolt 2, as can be seen in FIG. 4.

While the supporting plate 3, the axis of rotation 21 and the deformable block 29 each have a constant position with respect to the z direction, the position of the lever element 7 with the fork-shaped extensions 8 and with the adjusting surface 12 differs with respect to the z direction, in accordance with the unlocking position (FIG. 3) and the locking position (FIG. 4). The locking bolts 2 which are engaged behind by the fork-shaped extensions 8 have a correspondingly variable vertical position.

Figure 3:
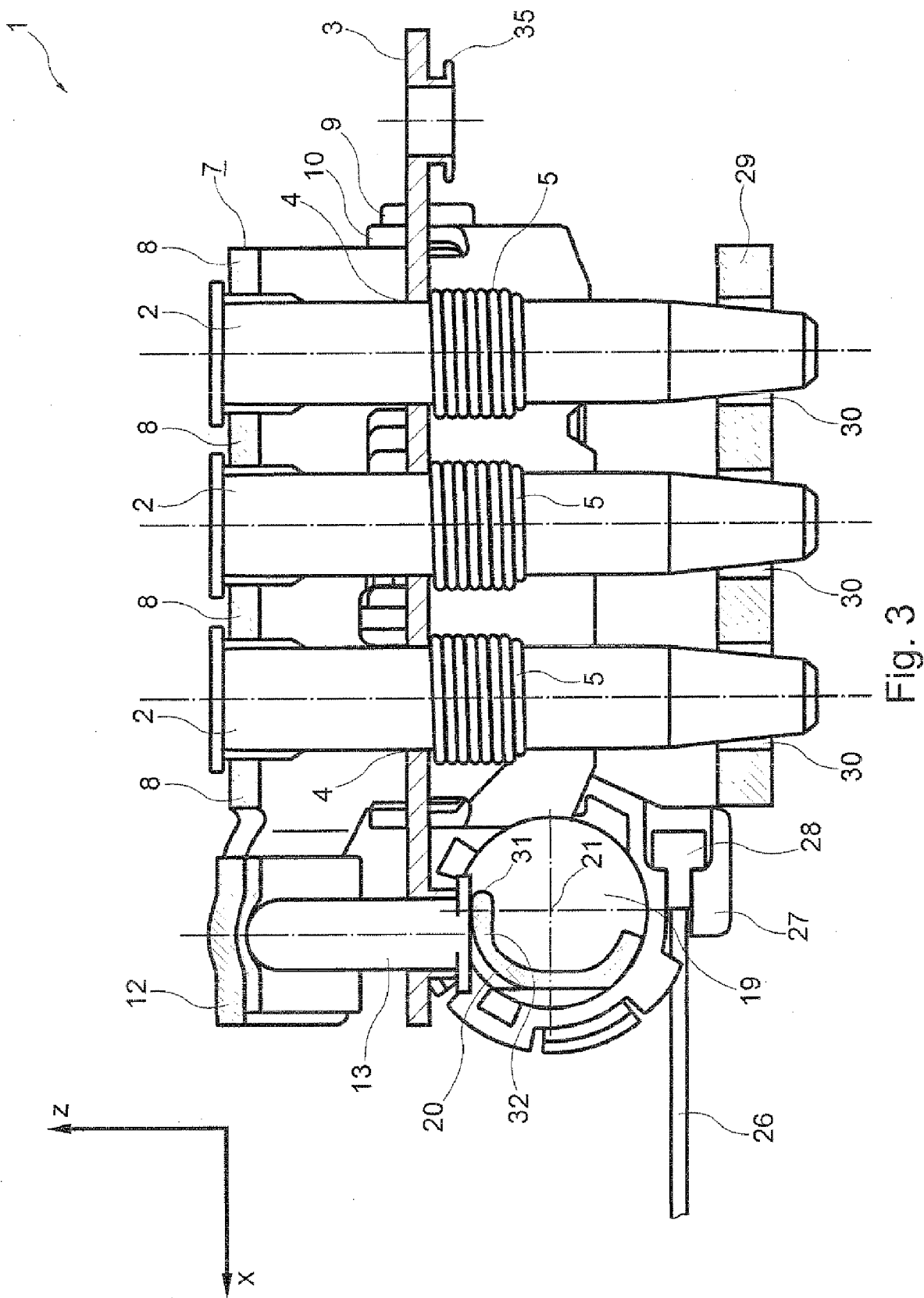
FIG. 3 shows the locking device in an unlocked state in longitudinal section.

While, in the equilibrium configuration of FIG. 4, the inner forces in the system are minimal, the equilibrium position of FIG. 3 is maintained by the unlocking pin 13 counter to the resetting forces of the prestressed spring elements 5. The unlocking pin 13 is supported on the eccentric surface 20 of the rotational element 19 via the supporting surface 18, and the unlocking pin 13 acts on the adjusting surface 12 of the lever element 7 in the unlocking direction (z direction).

The worm-shaped design of the eccentric surface 20 which forms a bent portion 31 over which the supporting surface 18 of the unlocking pin 13 rolls during the course of the rotational movement of the rotational element 19 through 180° about the axis of rotation 21 can be seen comparatively clearly. Furthermore, an inner edge 32 is formed on the inside of the eccentric surface 20 such that, in the locking position (FIG. 4), the supporting surface 18 of the unlocking pin 13 engages in the eccentric surface 20 in a largely form-fitting manner.

Figure 5:
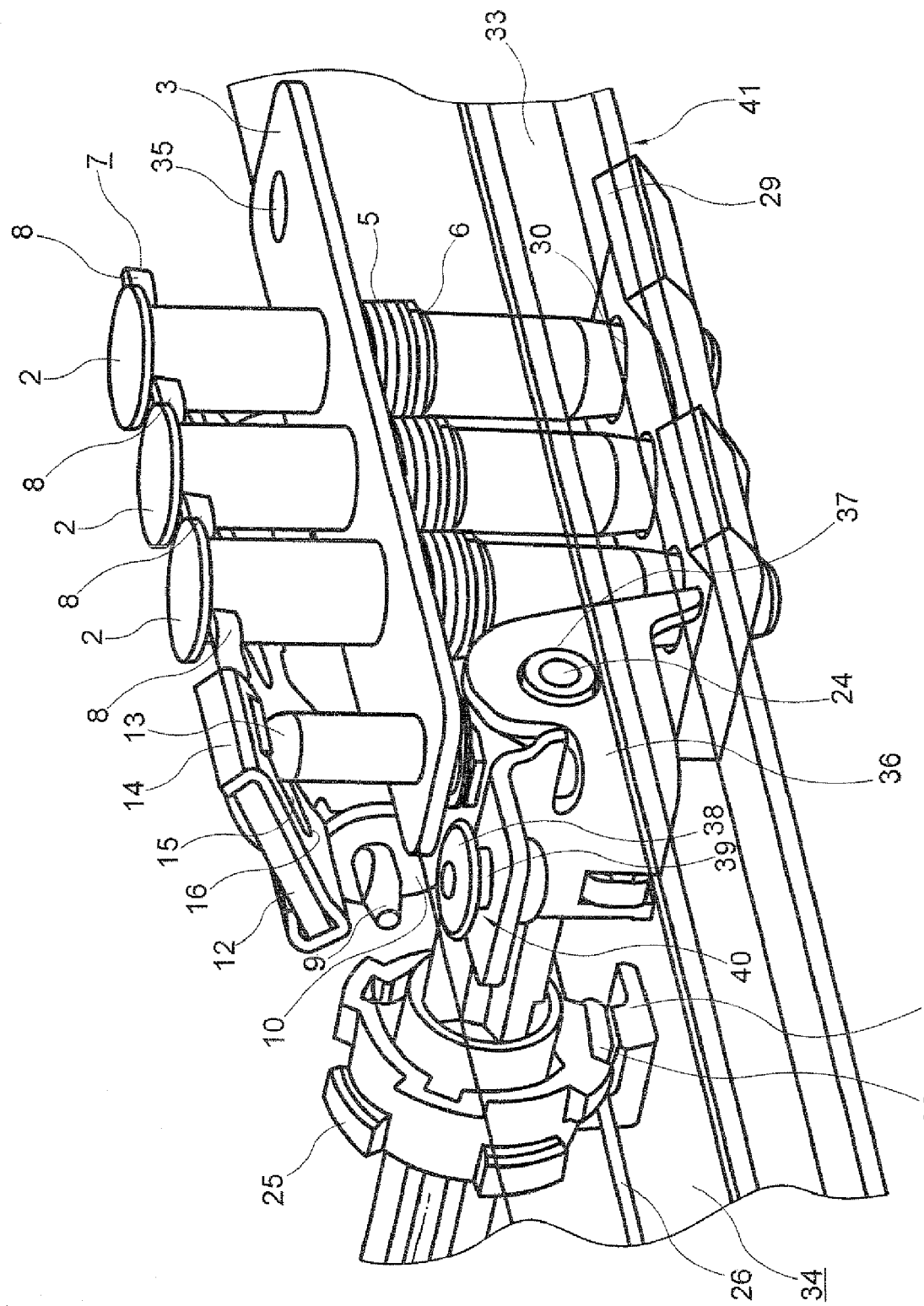
FIG. 5 shows the locking device which is connected to the articulation shaft and is mounted on a rail adjustment system, according to FIG. 1, in an unlocked state.

The connection of the locking device 1 to a rail adjustment system 34 is apparent from FIGS. 5 and 6 which are discussed below. The illustration of FIG. 5 largely corresponds to the illustration of FIG. 1, with the locking device 1 being fitted onto the upper rail 33 of a rail adjustment system 34 in FIG. 5. The upper rail 33 is shown in a semi-transparent illustration so as to make the components of the locking device 1, which are arranged in the z direction below the supporting plate 3 and are therefore enclosed by the upper rail 33, visible.

The connection of the locking device 1 is achieved essentially by means of the supporting plate 3 which rests on the upper side on the upper rail 33 and, with respect to the direction looking at the rear side of the upper rail 33, bears in the form of a retaining bracket. At least one fixing or latching means 35 is provided for fixing the supporting plate 3 to the upper rail 33.

Furthermore, the deformable block 29 is connected on the edge side to the upper rail 33. Furthermore, a retaining bracket 36 with a lateral bore 37 is designed as the retaining means and the rotational element 19 is mounted rotatably thereon. For this purpose, the hollow-cylindrical extension 24 of the rotational element 19 engages in the bore 37. The retaining bracket 36 is secured on the upper side on the upper rail 33 via a clamping knob or rivet 38, with the clamping knob 38 reaching through a further bore 39 in the retaining bracket 36 and a corresponding bore 40 in the upper rail 33. The retaining bracket 36 therefore transfers the lateral support of the articulation shaft 22 from the rotational element 19 to the clamping knob 38. By contrast, for structural reasons with regard to rail displaceability, a direct mounting of the rotational element 19 on the upper rail 33 is not possible, since this would necessitate a bore in the side region of the upper rail 33.

Figure 6:
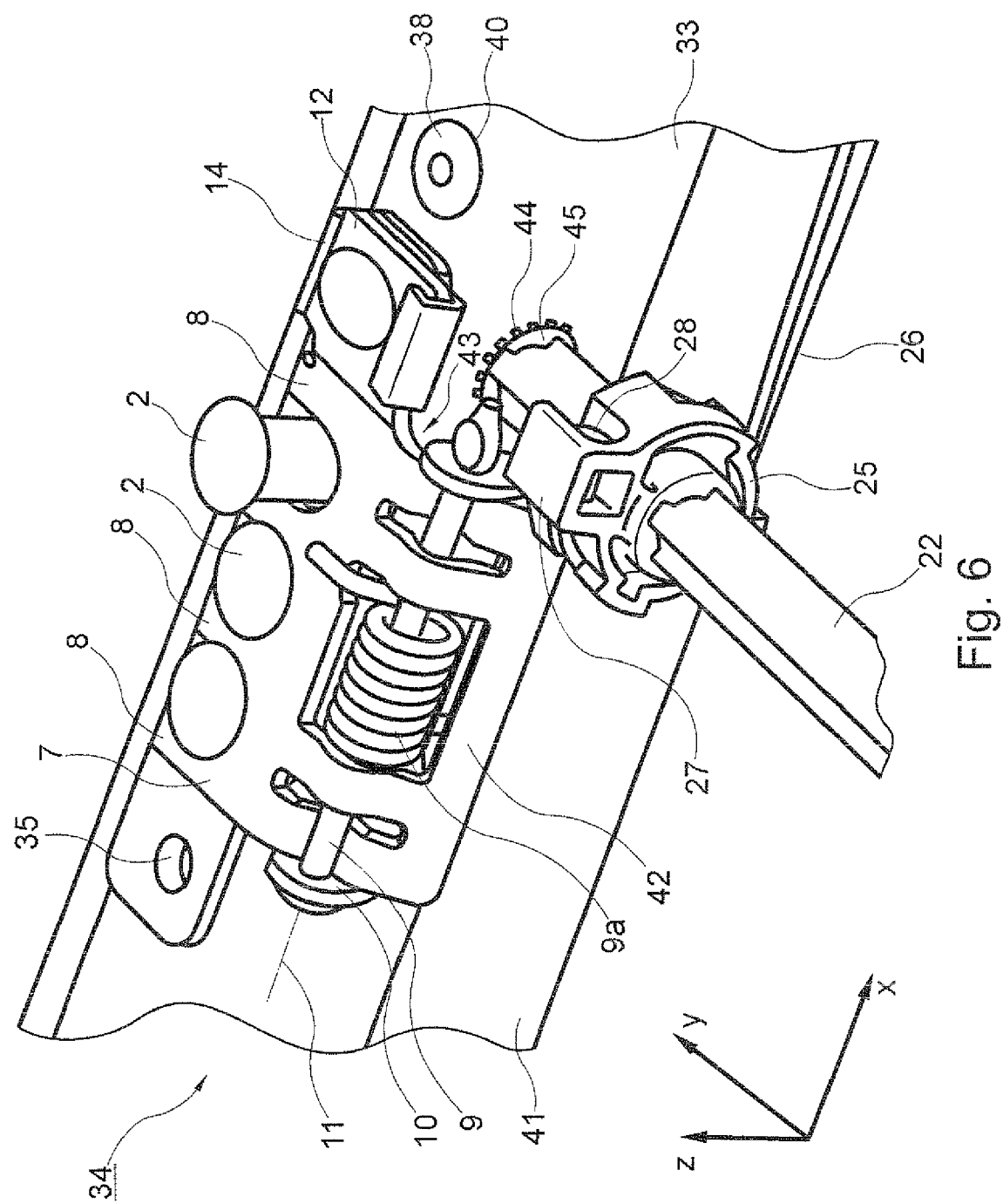
FIG. 6 shows the locking device, which is connected to the articulation shaft and is mounted on a rail adjustment system, in a locked state.

FIG. 6 shows the compact arrangement of the locking device 1 and the partial integration of the locking device 1 in the rail adjustment system 34. The upper rail 33, illustrated here such that it is not transparent, and the lower rail 41, which can be mounted in a positionally fixed manner and engages, with respect to the yz plane, around the upper rail in the form of a retaining bracket, are visible. With the exception of the lower rail 41, all of the visible parts are displaceable with the upper rail 33 in the x direction in relation to the lower rail 41.

FIG. 6 indicates a locking state in which only two of the three locking bolts 2 are in a locked position. In this case, the lever element 7 is lowered onto the supporting plate 3. Because of the hole spacing of the perforated grid of latching openings in the lower rail 41, which spacing differs from the distance between the locking bolts 2 in the x direction, one of the three locking bolts 2 is not fully lowered into the locked position.

The lever element 7 has on the opposite side of the fork-shaped extensions 8 with respect to the pivot axis 11 a tab 42 which, in the unlocked state of the locking device 1, is supported in the xz plane against the rear-side plate section 43 of the supporting plate 3, which plate section bears against the upper rail 33. The tab 42 does not have a force transmission function for the purpose of unlocking and/or locking the locking device 1 and is accordingly of narrow design.

Furthermore, the upper rail 33 is provided with a bore 44 on the inside through which the articulation shaft 22 is guided. A hollow-cylindrical disk wheel 45 is formed for the partial lateral support of the articulation shaft 22, said disk wheel surrounding the articulation shaft 22 in a form-fitting manner and being mounted rotatably in the bore 44 on the inside.

What is claimed is:
1. A locking device for a rail adjustment system of a vehicle seat, the locking device comprising
a plurality of locking bolts; and
a lever element, which is pivotable about a pivot axis, in operable communication with the plurality of locking bolts, for unlocking said plurality of locking bolts, wherein the locking bolts can be unlocked by linear movement of an unlocking pin that applies force to an adjusting surface of the lever element in an unlocking direction.

2. The locking device according to claim 1, further comprising a rotational element;

wherein the rotational element comprises an eccentric surface; and wherein the unlocking pin that acts on the adjusting surface of the lever element is actuated in the unlocking direction of the locking bolts by rotation of the eccentric surface of the rotational element.

3. The locking device according to claim 2, wherein the unlocking pin is inserted between and in operable communication with the eccentric surface and the adjusting surface lying opposite the latter.

4. The locking device according to claim 2, wherein the adjusting surface is enclosed by a template for an end-side guidance of the unlocking pin.

5. The locking device according to claim 2, wherein the rotational element is connected on an end side to an articulation shaft arranged horizontally and orthogonally with respect to the pivot axis.

6. The locking device according to claim 5, wherein the rotational element is mounted rotatably on a retaining bracket connected to the rail adjustment system.

7. The locking device according to claim 2, further comprising a supporting plate to which the lever element is pivotably coupled and which has bores for each locking bolt and for the unlocking pin.

8. The locking device according to claim 1, wherein the rail adjustment system comprises a lower rail adapted to be mounted in a positionally fixed manner and to receive at least some of the locking bolts of the locking device;

an upper rail adapted to be connected to a vehicle seat; wherein said upper rail is displaceable with respect to the lower rail; and an articulation shaft coupled to the rotational element; wherein said locking device and said articulation shaft are displaceable with the upper rail.

9. The locking device according to claim 8, wherein the locking device is connected fixedly to the upper rail, and wherein the locking bolts are provided for engagement in bores in the lower rail.

10. The locking device according to claim 8, wherein the articulation shaft is enclosed by a ring element for connection to an actuating element, by means of a cable pull peripherally connected to the ring element.

11. A vehicle seat comprising the locking device according to claim 1.

12. A motor vehicle comprising a vehicle seat according to claim 11.

* * * * *